United States Patent
Soudan

(10) Patent No.: US 6,625,956 B1
(45) Date of Patent: Sep. 30, 2003

(54) DEVICE AND METHOD FOR CONTINUOUSLY MANUFACTURING FOAM CUSHIONS FOR PACKAGING PURPOSES

(75) Inventor: Freddy Soudan, Deinze (BE)

(73) Assignee: N.V. Soudan Patrimonium & Consulting (BE)

(*) Notice: Subject to any disclaimer, the term of this patent is extended or adjusted under 35 U.S.C. 154(b) by 0 days.

(21) Appl. No.: 10/019,803

(22) PCT Filed: Jun. 22, 1999

(86) PCT No.: PCT/BE99/00079

§ 371 (c)(1),
(2), (4) Date: Feb. 20, 2002

(87) PCT Pub. No.: WO00/78522

PCT Pub. Date: Dec. 28, 2000

(51) Int. Cl.$^7$ ............................................. B65B 43/04
(52) U.S. Cl. ............................ 53/455; 53/459; 53/468; 53/562; 53/568
(58) Field of Search .................... 53/455, 459, 468, 53/469, 562, 568, 550

(56) References Cited

U.S. PATENT DOCUMENTS

| | | | | |
|---|---|---|---|---|
| 4,674,268 A | * | 6/1987 | Gavronsky et al. | 53/468 |
| 4,800,708 A | * | 1/1989 | Sperry | 53/449 |
| 4,854,109 A | * | 8/1989 | Pinarer et al. | 53/397 |
| 4,999,975 A | * | 3/1991 | Willden et al. | 53/451 |
| 5,139,151 A | * | 8/1992 | Chelak | 206/523 |
| 5,149,065 A | * | 9/1992 | Willden et al. | 267/136 |
| 5,335,483 A | * | 8/1994 | Gavronsky et al. | 53/451 |
| 6,003,288 A | * | 12/1999 | Sperry et al. | 53/552 |
| 6,131,375 A | * | 10/2000 | Sperry | 53/472 |
| 6,289,649 B1 | * | 9/2001 | Cherfane | 53/284.7 |

FOREIGN PATENT DOCUMENTS

EP    0 395 438 A1    10/1990

* cited by examiner

*Primary Examiner*—Rinaldi I. Rada
*Assistant Examiner*—Hemant M. Desai
(74) *Attorney, Agent, or Firm*—Piper Rudnick LLP

(57) ABSTRACT

A device and a method for continuously manufacturing foam cushions for packaging purposes. The device comprising a supply station and a foam dispensing station, said supply station being provided for continuously supplying to the dispensing station a web of envelope forming material positioned in a face to face relationship so as to form a folded-over edge. The dispensing station comprising a dispensing member provided for supplying a foaming substance into said envelope forming material. The device further transporting said material through said dispensing station according to a substantially horizontal direction and comprises a guiding and clamping unit provided for guiding said edge along said direction and clamping said material over a predetermined stroke extending from said edge in a direction substantially perpendicular to said direction.

10 Claims, 4 Drawing Sheets

DEVICE AND METHOD FOR CONTINUOUSLY MANUFACTURING FOAM CUSHIONS FOR PACKAGING PURPOSES

BACKGROUND OF THE INVENTION

The present invention relates to a device for continuously manufacturing foam cushions for packaging purposes, said device comprising a supply station and a foam dispensing station, said supply station being provided for continuously supplying to the dispensing station a web of envelope forming material positioned in a face to face relationship so as to form a folded-over edge, said dispensing station comprising a dispensing member provided for supplying a foaming substance into said envelope forming material, said dispensing member having an output oriented towards said edge, said device further comprises transport means provided for transporting said material through said dispensing station according to a predetermined direction, said device also comprises a sealing member provided on the one hand for forming a first and a second seam spaced apart from each other and extending substantially perpendicular to said direction and a third intermittent seam substantially parallel to said direction, said device comprising a cutting member provided for applying a cutting line between said first and second seam.

Such a device is known from EP-A-0.395.438. With the known device the supplied web material is transported in a vertical downwardly oriented direction by the transport means. The first and second seam as well as the cutting line are applied at a bottom part of the device in a horizontal direction perpendicular to the transport direction of the web. The foaming substance is injected into the envelope formed by the web material. The foaming substance is either injected in a vertical or in a horizontal direction.

A drawback of the known device is that when the foaming substance is injected in a vertical direction, it is injected against the second seam which forms the bottom of the cushion. As the second seam has just been applied, care has to be taken that this second seam is not broken by a too heavy injection force. When on the other hand the foaming substance is injected in a horizontal direction, perpendicular to the transport direction, the foaming substance has to be propelled over a suitable distance, which requires a considerable injection power. Irrespective of the direction according to which the foaming substance is injected, gravity will always cause the foaming substance to fall on the bottom of the cushion which is formed. This signifies that foaming substances, generally in liquid form, fall over the already applied foaming substances which are reacting in order to form foam. The thus created mixture of reacting foaming substances with liquid substances considerably disturbs the reacting process and the yield of the latter. Moreover this mixture also leads to an irregular cell structure of the foam caused by the foaming under chaotic conditions in a restricted volume.

The object of the invention is to realise a device for continuously manufacturing foam cushions enabling an improved foaming reaction leading to a better foam quality and with a considerably lower risk of damaging the second seam.

OBJECT AND SUMMARY OF THE INVENTION

For this purpose a device according to the present invention is characterised in that said transport means are provided for transporting said web material in a substantially horizontal direction and comprises a guiding and clamping unit provided for guiding said edge along said direction and clamping said material over a predetermined stroke extending from said edge in a further direction substantially perpendicular to said direction. Because the web material is transported in a horizontal direction and the dispensing member's output is oriented towards the edge, the foaming material is not dispensed against the seams which extend perpendicular to the edge. The gravity will cause the foaming substance to fall on the edge and not on the seam. The risk of damaging the edge is thus substantially reduced. Moreover the guiding and clamping unit guide and support the edge so that the risk of damaging the edge is to be neglected. Because the web material moves in horizontal direction, the supplied foaming substances reaching the edge also move in the same horizontal direction. In such a manner the newly supplied liquid foaming substances do substantially less mix with the reacting foaming substances which move away from the dispensing member. So the liquid material substantially less disturbs the foaming reaction of the substances and a better foam quality is obtained.

A first preferred embodiment of a device according to the invention is characterised in that said guiding and clamping unit comprise a first and a second beam applied face to face, at least one of them being resiliently mounted. The edge can in such a manner be reliably guided by the two beams in between which it is clamped. The resilient mounting of at least one beam facilitates the supply of the web material.

A second preferred embodiment of a device according to the invention is characterised in that said transport means are further provided for applying a double fold at said folded-over edge. The double fold strengthens the edge and reduces the risks of damaging the edge. It moreover enables to improve the guiding of the edge as it makes the edge thicker.

Preferably said dispensing member is mounted on a movable arm provided for being moved between a first and second position whereby said dispensing member is placed inside, respectively outside a volume delimited by the envelope forming material. In such a manner the dispensing member can be removed from the volume formed by the web material.

Preferably a cleaning unit is applied at said second position, said cleaning unit being provided for cleaning said dispensing member. The dispensing member can thus be cleaned from remaining foaming substances, which could obstruct the output of the dispensing member.

A third preferred embodiment of a device according to the invention is characterised in that said transport means comprise a first and a second roller set, the rollers of each set being mounted at a predetermined distance from each other and extending substantially perpendicular to said direction at opposite sides of each web, said predetermined distance being at least 5 mm. In such a manner a cushion of predetermined thickness can be formed.

A fourth preferred embodiment of a device according to the invention is characterised in that said transport means comprise a first and second toothed roller mounted in an engaging manner at opposite sides of said web. The toothed roller enables a good mixing of the foaming substances when the mixing is not performed by the dispensing

DETAILED DESCRIPTION OF THE INVENTION

The invention will now be described in more details by means of preferred embodiments illustrated by way of example in the drawings in which.

Figure 1:
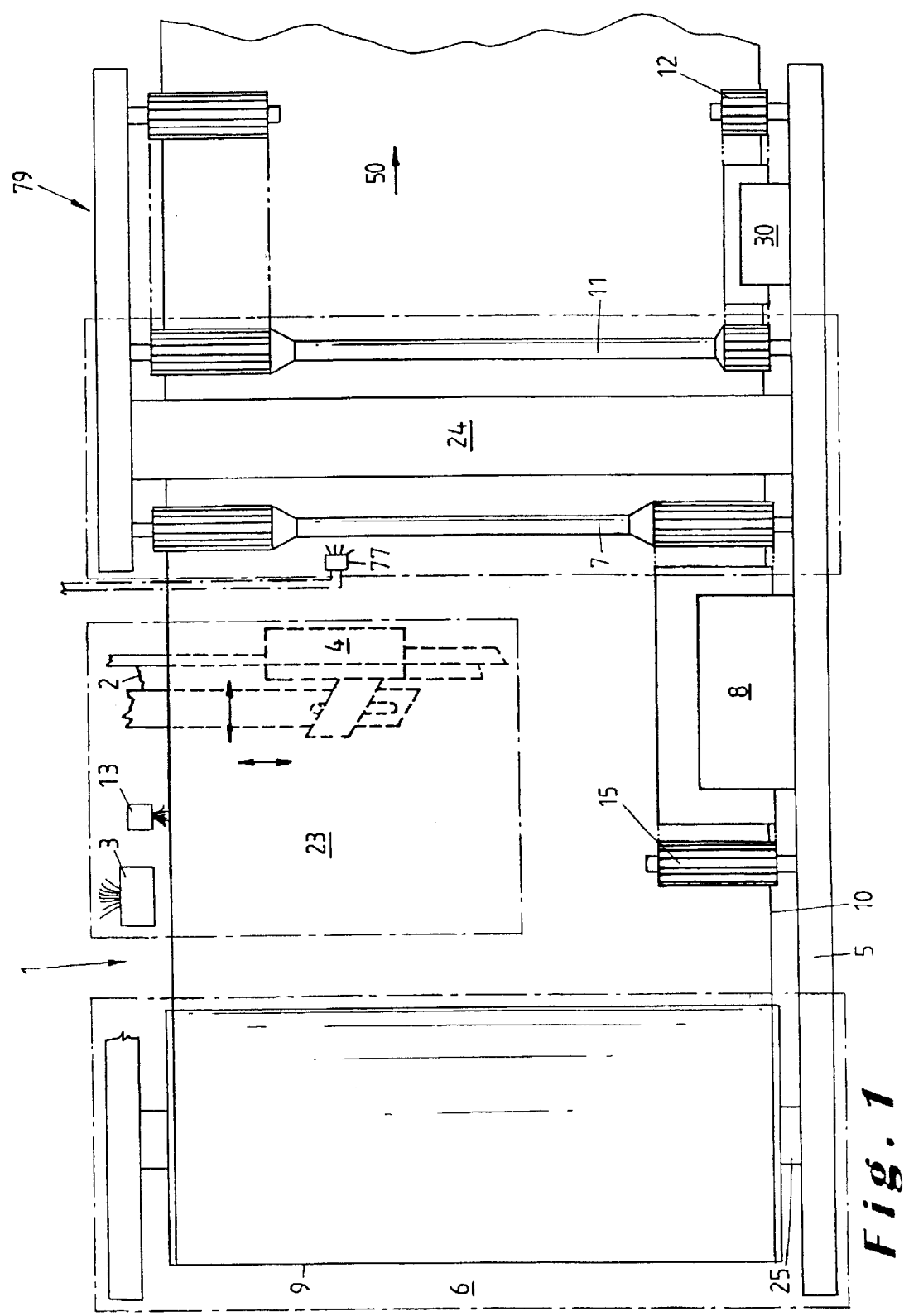
FIG. 1 shows a front view of a device according to the invention.

In the drawings a same reference sign has been assigned to a same or analogous element.

DETAILED DESCRIPTION OF THE INVENTION

The device 1 for continuously manufacturing foam cushions for packaging purposes according to the invention and illustrated in FIG. 1, comprises a supply station 6 placed upstream a dispensing station 23, and a sealing and cutting station 24 placed downstream the dispensing station. The different stations are preferably mounted on a frame 5. Nevertheless the supply station could be formed by a stand alone station not mounted on a common frame with the other stations. However a common frame has the advantage of giving a rigidity to the whole device.

The supply station comprises a spindle 25 provided for the mounting of a coiled web 9 of envelope forming material. This material is positioned in a face to face relationship so as to form at its underside, when mounted on the spindle, a folded-over edge. The material is for example made of plastic such as polyethylene (PE). The supply station is provided for continuously supplying the web material to the dispensing station by unrolling the coiled web. This unrolling is realised by transport means comprising a guiding and clamping unit 8 and a set of drive rollers 7, 11, 12 and 15, all mounted on frame 5. As the material is mounted on the spindle 25 it is easy to apply a new coiled web. Moreover different widths are possible for the web, as it is not necessary that the coil comprising the web extends over the whole length of the spindle.

Figure 2:
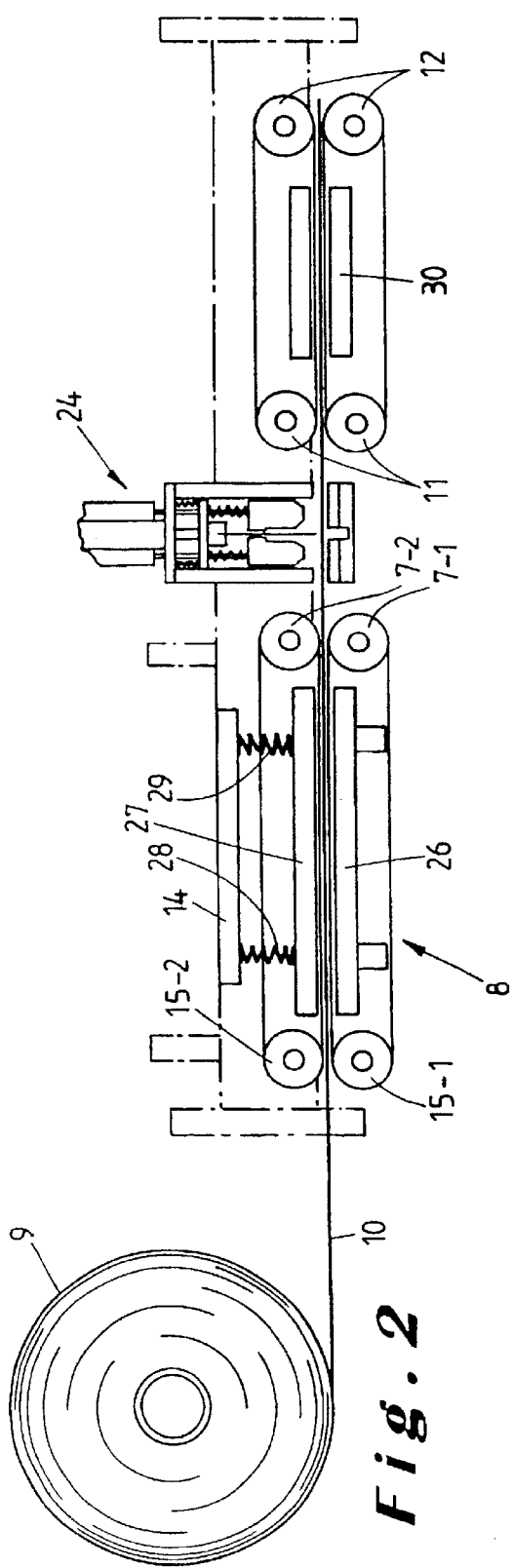
FIG. 2 shows a cross-section along a line II–II' of the device shown in FIG. 1.

The guiding and clamping unit comprises a first roller 15-1 and beams 26 and 27 mounted at the bottom of the frame as illustrated in FIG. 2. Beam 27 is resiliently mounted, for example on springs 28 and 29. Of course, it is also possible to mount beam 26 resiliently. The resilient mounting of at least beam 27 enables to clamp the supplied web between the beams, so that the web is not only adequately guided but also supported at its underside. The springs are fixed on a carriage 14, mounted on the frame 5. A second roller 15-2 is also mounted on the carriage 14. Between the first and second rollers 15-1 and 15-2, the web is entered and guided thereafter towards the beams 26 and 27.

The dispensing station 23 comprises a dispensing member 4, preferably formed by a spray gun, provided for supplying a foaming substance. An output of the dispensing member is downwards oriented, i.e. towards the beams 26 and 27 of the guiding and clamping unit 8. The dispensing member supplies a two components foaming substance, which components react after being output in order to form a foam. The dispensing member is mounted on a movable arm 2 provided for moving the dispensing member in and out of the web. The movable arm further enables a rotation of the dispensing member in order to bring the latter towards a cleaning unit 3 provided for cleaning the output of the dispensing member. The rotational movement is only possible when the dispensing member is removed from the volume enclosed by the web, in order to not damage the web. The cleaning of the output of the dispensing member, preferably by means of a solvent, enables to remove foaming substance which otherwise remains on the output and could obstruct the latter or got mixed with the foaming substances to be applied.

Preferably the device comprises also a blowing unit 77 for blowing air or a gas against the transport means. In such a manner the transport means can be cleaned and it is prevented that the web gets stuck to the rollers 7 or 11.

Instead of using two components of reacting foaming substances, a foaming granulate on a starch basis could also be used. In the latter case, the dispensing member is formed by a supply duct for the granulates and another one for supplying a liquid, preferably water which is atomised or sprayed over the supplied granulates. In such a manner the supplied granulate is sucked in the sprayed or atomised liquid what stimulates the dispensing. Preferably a cellulose film is then used as web in order to obtain an environment friendly biodegradable foam cushion. Polycaprolacton could also be used as material for the web.

The dispensing station further comprises a sensor 13 provided for monitoring the filling of the web volume with foaming substances. The sensor, for example formed by an optical cell, is oriented towards the inner volume delimited by the web. The sensor is provided for monitoring the height reached inside the volume delimited by the web by the supplied foaming substances. When a predetermined height, indicating the required filling level, is reached, this predetermined level is detected by the sensor which causes the dispensing of foaming substances to stop.

Figure 3:
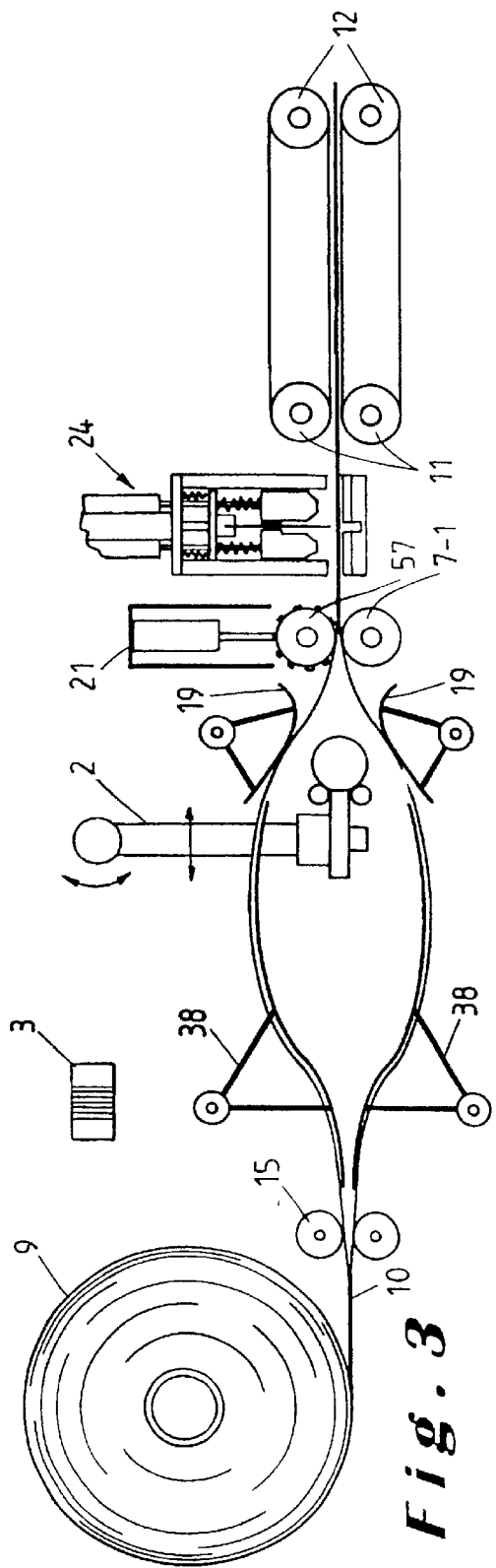
FIG. 3 shows a top view of the same device as illustrated in FIG. 1.

The transport means further comprise a first 7-1, 7-2 and a second 11-1, 11-2 set of rollers placed on both sides of the sealing and cutting station 24. Those rollers extend over the whole width of the web and are provided for transporting the web through the dispensing station and the sealing and cutting station towards an output station 79. The web passes through the space between the pair of rollers as illustrated in FIGS. 2 and 3. The rollers contact the web preferably only at an upper and a lower part and have to this purpose a central part with a smaller diameter than the upper and lower parts. One of the rollers of roller pair 7 is mounted on a translation member 21, for example a piston enabling a horizontal movement to and from the web in order to apply a pressure on the web. Guiding units 19 are placed upstream the roller pair 7 and are provided for guiding the web, in particular when filled with the foaming substances towards the roller pair. Preferably an auxiliary pair of rollers 12 is provided downstream the roller pair 11 as well as an auxiliary support member 30 for supporting a lateral side of the formed cushion during the application of the seam as will be explained hereafter. The auxiliary pair of rollers not only guides and supports the formed cushion, but also takes care of the supply of the formed cushions at the output of the device.

Figure 4:
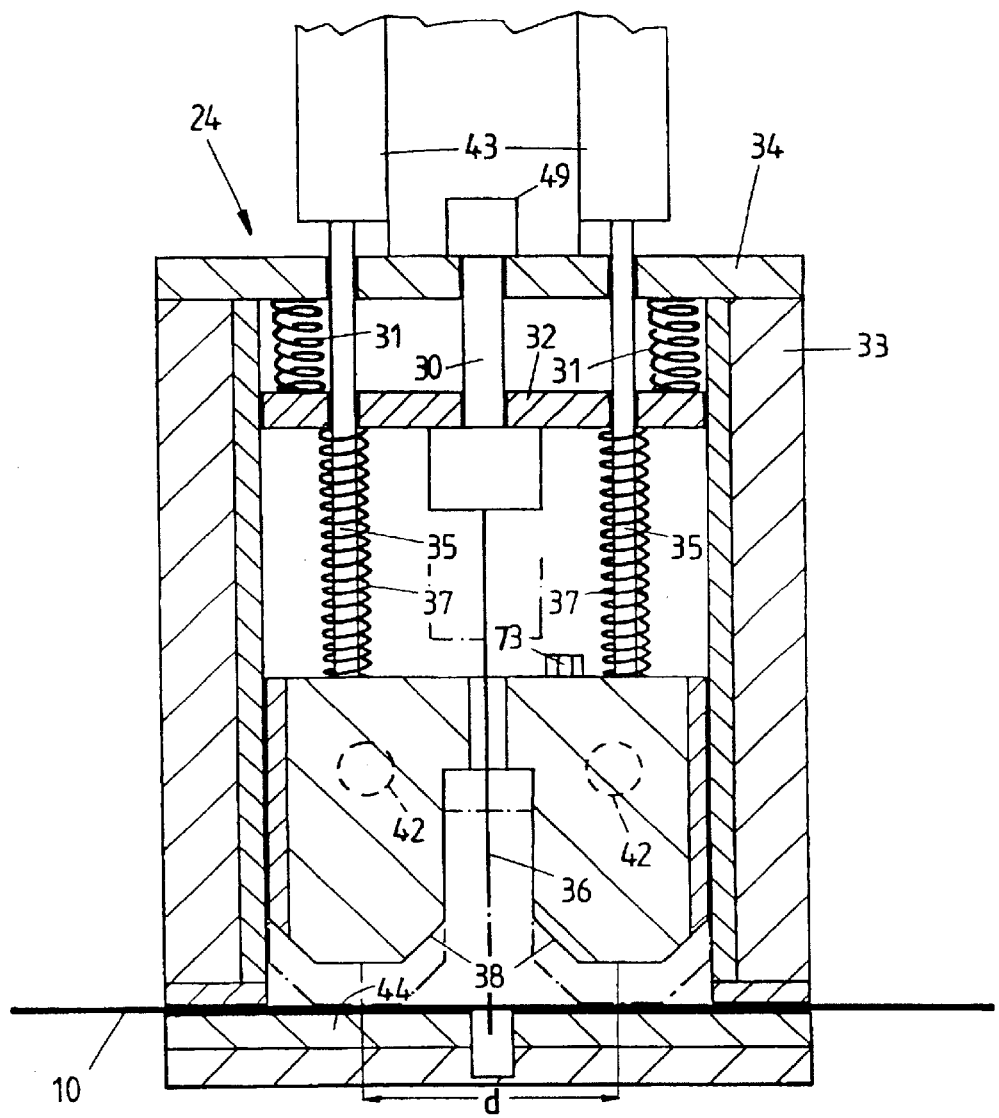
FIG. 4 shows more details of the sealing and cutting member.

The sealing and cutting station 24 shown in FIG. 4 comprises a two head sealing member 38. Between the heads of the sealing member extends a cutting knife 36. The heads and the knife are mounted inside a subframe 33,34, which is mounted on the main frame 5. The heads are mounted on guiding rods 35 around which a first spring 37 is wrapped. The guiding rods 35 slide into sliding members 43. The guiding rods 35 are linked with a beam 32, forming a bridge between both rods. Between the beam 32 and the subframe 34 second springs 31 are mounted offset the guiding rods 35. The rods are indirectly actuated by means of hydraulic or pneumatic cylinders 49 mounted on the subframe and which exert a pressure force on the beam 32. The cylinders 49 are mounted one above each other so that in FIG. 4 only one is shown. The heads face a counter element 44 for example made of Teflon (registered Trademark). A heating element 42, for example an electrical resistance, is mounted inside the heads in order to heat them up for sealing purposes. A thermocouple 73 is also applied on the heads, in order to control the heat production of the heads.

The cylinders 49 enable a movement of the beam 32 and thus of the heads and the knife towards and from the counter element 42. The first springs 37 are compressed during the movement towards the counter element, whereas the second springs 31 are extended during that same movement. The springs cause the return of the beam to a rest position and thus of the heads and the knife.

The manufacturing of a cushion by means of the device according to the invention will now be described. The supply station supplies the coiled web 9 of envelope forming material to the transport means. The web is positioned in a face to face relationship as shown in FIG. 3 so as to form a folded-over edge at its underside. That fold-over edge is supplied to the guiding and clamping unit and moves between the beams 26 and 27. Those beams are provided to apply a double fold 70 (FIG. 5) at the folded-over edge. Alternatively it would also be possible to apply that double fold already during manufacturing of the web.

A pulling unit 38 opens the envelope formed by the web in order to enable the dispensing unit 4 to enter into the envelope. The envelope is further retained by the first roller pair 7 as well as by the rollers 15.

Figure 5:
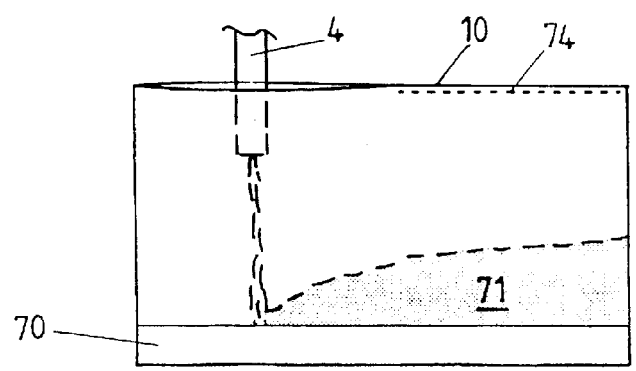
FIG. 5 illustrates the filling of the envelope with the foaming substance.

Suppose, for the sake of clarity, that seams have already been applied on the web by the sealing unit 24. The filling of the envelope can be started, as soon as the sensor 13 has detected that a new envelope is placed under the dispensing member 4. The dispensing member is then activated, for example by means of an enabling signal generated by the sensor 13, so that foaming substances flow into the envelope. As the supply station continuously supplies the web and the transport means pull the web through the dispensing station, the envelope is filled starting from a right hand corner where the foaming substances start to accumulate and forming foam. The horizontal movement of the web causes the foam to be applied over the whole length of the dispensing station. In such a manner the freshly supplied foaming substances are not applied over the already supplied foaming substances 71 as illustrated in FIG. 5. This causes that the foaming process of the substances already applied in the web 10 is not disturbed by the freshly applied substances. An improved foam quality is thus obtained. Moreover an increase of approximately 30% of the yield is obtained.

As the output of the dispensing member is oriented towards the folded-over edge, which is retained in the guiding and clamping unit, the substances fall down due to gravity, without applying a heavy force on the edge which could damage the edge. The force with which the dispensing unit outputs the foaming substances could be rather high, in particular when an injection technique is used. As the edge is retained within the clamping beams 26 and 27, the foaming substances are not directly sprayed on the edge. In particular when the edge is double folded, sufficient material is retained within the claming unit, thus provided a secure grip on the edge. Moreover unfolding of the double fold will provide more space for the foaming substances at the bottom of the envelope so that more space is offered to the expanding foam.

Preferably the dispensing member outputs at a substantially constant flow rate. To enable different filling levers and thus different cushion volumes, it is sufficient to adapt the speed at which the web travels along the dispensing station. As the output of the foaming substances is at constant flow rate, the travel speed will determine the time that the envelope remains at the dispensing station and thus the amount of foaming substances supplied to the envelope. As the web travels in horizontal direction, even with reduced travel speed, the risk that freshly supplied foaming substances would disturb the foaming process is still reduced.

Once the sensor detects that the predetermined level of the foaming substances in the envelope has been reached, it produces a stop signal for the dispensing member 4, causing the latter to stop. The dispensing member is removed from the envelope by an upward movement of the latter followed by a rotational movement towards the cleaning unit 3.

The stop signal also causes an activation of the sealing member 24. The cylinders 49 now cause the beam 32 to be moved towards the web and the counter element 44. The springs 37 are now compressed by the sliding movement of beam 32, whereas the springs 31 are extended. Those movements caused the heads 38 to move towards the web for sealing the latter. The knife 38 is also moved in the same direction as the heads. The heads are heated by means of the heating element 42. When the heads reach the web each of the heads apply a seal on the web in such a manner that a first and a second seal, extending in parallel, are applied on the web. The seams are spaced apart over a distance d and extend substantially perpendicular to the direction of movement of the web. The first seal forms the closure of an already formed cushion, whereas the second seal forms the front surface of a new cushion to be formed.

As the downward movement of the beam 32 continues during the application of the seal, the knife will reach the web and will apply a cutting line between the first and second seal. Dependent on the applied pressure, the elastic properties of the springs 37, and the type of knife, the web will either be completely cut along the cutting line or a cutting line will be applied, enabling to tear away the cushion at a later stage.

The sealing member is further provided for applying a third intermittent seal, substantially parallel to the movement of the web at the top side of the web as will be described in more details hereinafter. In such a manner openings are left on top of the cushion enabling gas formed by the foaming reaction to escape.

Due to the fact that the first and second seal are applied perpendicular to the direction of movement, indicated by arrow 50, of the web and due to the fact that the foaming substances are not sprayed against the first and second seal, the spraying can not damage those seals. Moreover the first and second seal are preferably applied when no spraying of the foaming substances occurs, which also reduces the risk of damaging those seals.

Once the seals are applied, the process is started over again, in order to form a subsequent cushion by spraying foaming substances into the envelope formed by the web. The first and second spring will cause the heads and the knife to return to their original rest position once the cylinders 49 stop to apply a pressure on the beam 32.

With the device according to the invention, it would also be possible to make cushions which are plate shaped and have for example a thickness of 1.5 by 2 cm. To this end the rollers 7 and 11 of the first and second roller set are each time mounted at a predetermined distance d'from each other, said distance d'being at least 5 mm. Preferably the distance d'is adjustable so that plates with a different thickness can be manufactured. With this embodiment the sealing member could only be used at the start of the process for applying the first seam and a continuous plate could be manufactured. Of course the third seam could still be applied. The speed at which the web circulates through the device has to be adjusted in such a manner as to give the foaming substances sufficient time to react before the plate leaves the device. For polyurethane foam for example which hardens within 20 seconds, the web should have a speed of 0.5 m/sec if the device has a length of 10 meter.

For dispensing the foaming substances, a spray gun is generally used wherein the substances are mixed in a mixing chamber. According to an alternative embodiment, the foaming substances are not mixed in the spray gun, but supplied to separate outputs of the dispensing member to the envelope of the web. The mixing is realised by means of a first and second toothed roller, for example applied instead of the first roller pair 7. Those toothed rollers are mounted in an engaging manner at opposite sides of the web. When the web, in which the foaming substances are already present, passes between the teeth of the toothed rollers, the substances are mixed so that the foaming process can start. As the toothed rollers extend over the whole width of the web, the mixing is realised over this whole width, leading to a homogeneous foaming process.

Figure 6:
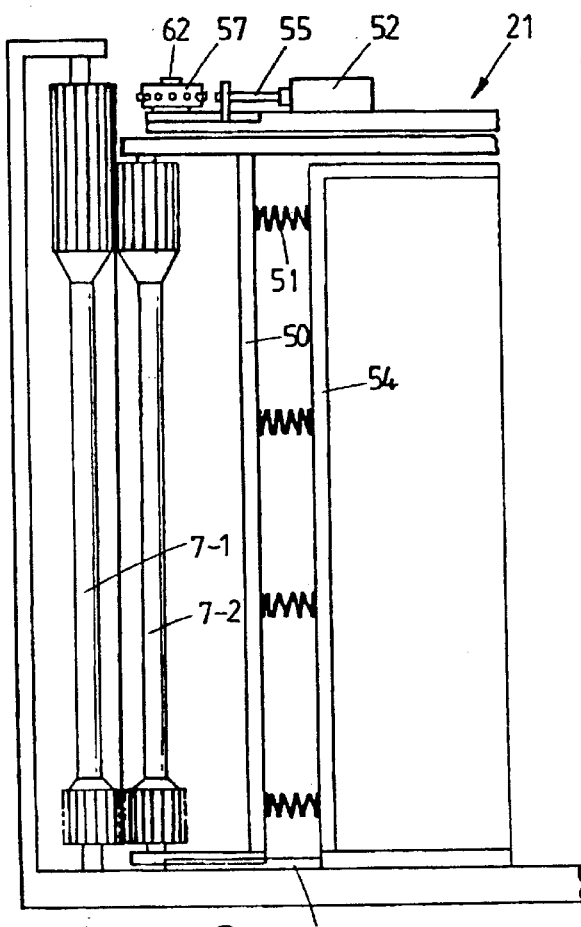
FIG. 6 shows a preferred embodiment of a sealing member provided for applying a horizontal third seam.

FIG. 6 illustrates a preferred embodiment of a sealing member for applying the horizontal third seal as used in the device according to the invention. Roller 7-2 of the roller pair 7 is mounted on a subframe 50 which slides over a rail 53. The subframe is fixed by means of springs 51 to a further subframe 54. The frame is pushed towards the roller 7-1 by means of a cylinder and a rod which are not shown in the drawings. In such a manner the web can be clamped between the rollers 7 during application of the seal and the frame 50 can be withdrawn to enable the passage of the web filled with foam On top of the subframe 50 a cylinder 52 provided with a rod 55 is mounted. The rod 55 carries a wheel 57 mounted on a shaft 62. The cylinder is for example hydraulically or pneumatically activated and enables to move the wheel 57 to and from the roller 7-1 in order to bring the wheel into contact with the web, which travels between the rollers 7-1 and 7-2. This enables that the wheel, which is heated for sealing the web, is no constantly into contact with the web. Indeed a constant contact would lead to a melting of the web material.

Figure 7:
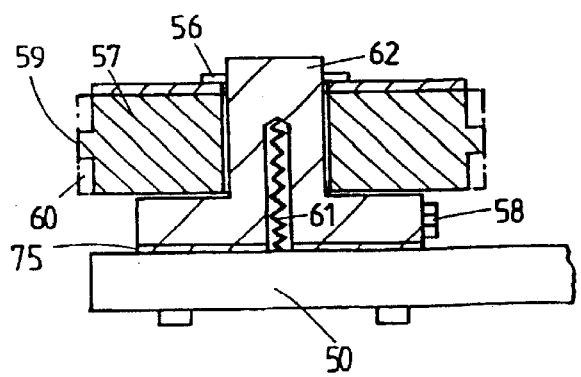
FIG. 7 shows a cross-section along a direction VII–VII' of FIG. 6.

A cross section along line VII–VII'of the wheel 57 is illustrated in FIG. 7. The wheel can freely rotate around the shaft 62. The wheel is preferably fixed to the shaft by means of a pen 56. Both the wheel and the shaft are preferably made of copper, since copper has good a good thermal conductivity. Inside the shaft 62 an electrical resistance 61 is mounted which is provided for supplying heat to the shaft when an electrical current flows through the resistance. As the shaft is made of thermal conductive material and as the wheel is thermally coupled with the shaft, the heat generated in the shaft will flow towards the wheel.

Figure 8:
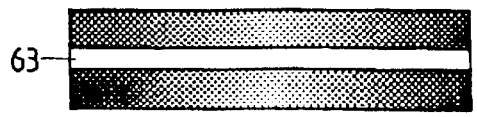
FIGS. 8, 9 and 10 show embodiments of the peripheral surface of a wheel which belongs to the sealing member illustrated in FIG. 6.
Figure 9:
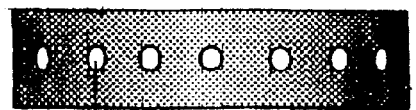
Figure 10:
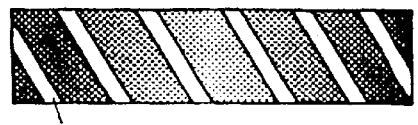

The wheel is at its peripheral provided with a profile which can be formed by teeth 59 or by strokes 60. Those strokes extend either vertical or inclined as illustrated in FIG. 10. Of course alternative embodiments are possible such as for example only small points or even a complete ring 63 such as illustrated in FIG. 8. A thermocouple 58 controls the temperature of the shaft and thus the current supply to the resistance. The subframe 50 is thermally insulated from the shaft, for example by the insertion of a Teflon (Registered Trademark) layer 75 between the wheel, shaft 62 and the frame 50, in order to avoid a heat leak towards the subframe.

The movement of the upper horizontal border of the web along the wheel 57 will cause the latter to rotate around the shaft when the wheel is in contact with the web. Since the profile 59 or 60, 63 contacts the web, the heat stored in the profile is transferred to the web so that the third seal 74 is applied on the web (see FIG. 5). The pattern applied by the seal on the web will of course be dependent on the profile on the wheel 57. As this pattern is discontinuous for the profiles 59, 60, openings are formed between subsequent seals, which enables the gas formed during the foaming process to escape through these openings. The toothed or stroked profile on the periphery of the wheel 57 enables to keep the wheel at temperature as it is only when the teeth or strokes contact the web that a seal is applied. This renders the temperature control simple and reliable.

As the wheel 57 is simply mounted on the shaft, the application of a seal of different patterns can be realised by simply mounting a different wheel on the shaft.

Figure 11:
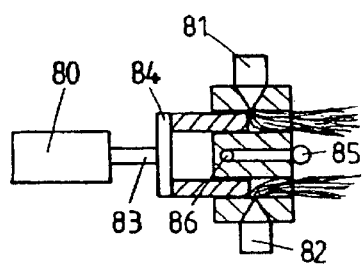
FIGS. 11 and 12 show a dispensing member, taken partially in section, with piston rods in open and closed positions, respectively.
Figure 12:
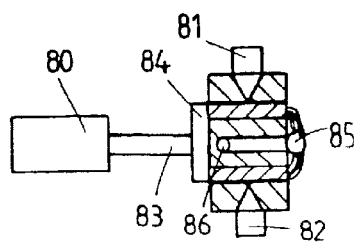

The FIGS. 11 and 12 show an embodiment of a dispensing member, where the foaming substances are separately supplied and not mixed with the dispensing member. The illustrated dispensing member comprises two inputs 81 and 82 for supplying each time the foaming substances. The inputs give access to channels in which move rods 84 connected to a piston rod 84 actuated by a cylinder 80. The movement of the rods 84 inside the channels closes or opens the inputs 81 and 82. A spray nozzle 85 connected to a supply input 86 is provided for spraying a solvent towards the channel outputs, in order to clean them from remaining foaming substances.

When foaming substances have to be supplied, the cylinder 80 pulls the rods 84 partially out of the channels in order to open the inputs 81 and 82 and allow the foaming substances to reach the channel output. In order to close the inputs, the cylinder pushes rod 83 back so that rod 84 penetrates into the channels.

What is claimed is:

1. A device for continuously manufacturing foam cushions for packaging purposes, said device comprising a supply station and a foam dispensing station, said supply station being provided for continuously supplying to the dispensing station a web of envelope forming material positioned in a face to face relationship so as to form a folded-over edge, said dispensing station comprising a dispensing member provided for supplying a foaming substance into said envelope forming material, said dispensing member having an output oriented towards said edge, said device further comprises transport means provided for transporting said material through said dispensing station according to a predetermined direction, said device also comprises a sealing member provided on the one hand for forming a first and a second seam spaced apart from each other and extending substantially perpendicular to said direction and a third intermittent seam substantially parallel to said direction, said device comprising a cutting member provided for applying a cutting line between said first and second seam, characterised in that said transport means are provided for transporting said web material in a substantially horizontal direction and comprises a guiding and clamping unit provided for guiding said edge along said direction and clamping said material over a predetermined stroke extending from said edge in a direction substantially perpendicular to said direction.

2. A device as claimed in claim 1, characterised in that said guiding and clamping unit comprise a first and a second beam applied face to face, at least one of them being resiliently mounted.

3. A device as claimed in claim 1, characterised in that said transport means are further provided for applying a double fold at said folded-over edge.

4. A device as claimed in claim 1, characterised in that said dispensing member is mounted on a movable arm provided for being moved between a first and second position whereby said dispensing member is placed inside, respectively outside a volume delimited by the envelope forming material.

5. A device as claimed in claim 4, characterised in that a cleaning unit is applied at said second position, said cleaning unit being provided for cleaning said dispensing member.

6. A device as claimed in claim 1, characterised in that said transport means comprise a first and a second roller set, the rollers of each set being mounted at a predetermined distance from each other and extending substantially perpendicular to said direction at opposite sides of each web, said predetermined distance being at least 5 mm.

7. A device as claimed in claim 1, characterised in that said transport means comprise a first and second toothed roller mounted in an engaging manner at opposite sides of said web, said dispensing member having a separate output for the output of each of the foaming substances.

8. A device as claimed in claim 1, characterised in that said sealing member comprises a wheel provided on its periphery with a profile for applying said third seam, said wheel being provided with heating means.

9. A device as claimed in claim 8, characterised in that said profile is either toothed or made of strokes.

10. A method for continuously manufacturing foam cushions for packaging purposes, said method comprises:

supplying a web of envelope forming material positioned in a face to face relationship so as to ford a folded-over edge;

dispensing a foaming substance into said envelope forming material, while moving said envelope along a predetermined direction, said foaming substance being applied in a further direction oriented towards said edge;

applying a first and a second seam spaced apart from each other and extending substantially perpendicular to said direction and a third intermittent seam substantially parallel to said direction;

applying a cutting line between said first and second seam;

characterised in that said envelope is moved in a horizontal direction and is guided and clamped at said edge over a predetermined stroke extending from said edge in a further direction substantially perpendicular to said direction.

* * * * *